United States Patent [19]

Chen

[11] Patent Number: 4,950,020
[45] Date of Patent: Aug. 21, 1990

[54] CONVERTIBLE CANOPY APPARATUS FOR AUTOMOBILES

[76] Inventor: Fu-Ping Chen, No. 32, Lane 412, Hsin I Street, Hsin Hua Chen Tainan Hsien, Taiwan

[21] Appl. No.: 376,749

[22] Filed: Jul. 7, 1989

[51] Int. Cl.$^5$ ............................................. B60J 7/00
[52] U.S. Cl. ..................................... 296/95.1; 296/136
[58] Field of Search ...................... 296/136, 95.1, 163

[56] References Cited

U.S. PATENT DOCUMENTS

| | | | |
|---|---|---|---|
| 2,570,399 | 10/1951 | Smith | 296/95.1 |
| 2,643,911 | 6/1953 | Lyon | 296/95.1 |
| 3,174,536 | 3/1965 | Francis | 160/370.2 |
| 3,638,993 | 2/1972 | Sullivan | 296/95.1 |

FOREIGN PATENT DOCUMENTS

| | | |
|---|---|---|
| 2827095 | 1/1980 | Fed. Rep. of Germany . |
| 68423 | 5/1980 | Japan . |
| 285121 | 12/1986 | Japan . |
| 6715664 | 5/1968 | Netherlands . |

Primary Examiner—Robert R. Song
Attorney, Agent, or Firm—Morton J. Rosenberg; David I. Klein

[57] ABSTRACT

A convertible canopy apparatus for mounting on a roof of an automobile is provided for protecting the interior of the automobile from radical temperature changes. The apparatus includes a front and a rear canopy device normally sheltered under an airfoil cover. In use, the cover is elevated to a release position and the two canopy devices are sequentially operated to telescopically extend in opposite longitudinal directions.

4 Claims, 5 Drawing Sheets

CONVERTIBLE CANOPY APPARATUS FOR AUTOMOBILES

BACKGROUND OF THE INVENTION

This invention relates to a novel apparatus for shading a vehicle such as an automobile, and more particularly to a convertible canopy apparatus which can be mounted on a roof of an automobile and extended over it for protecting the automobile from radical temperature changes when the automobile is left in the sun.

When vehicles such as automobiles are left in the sun for extended periods of time, the interior thereof becomes very hot, making the vechile uncomfortable to operate. The seats may become too hot to sit in, and the steering wheel may be too hot to be grasped. The owner or operator may be forced to drive with the windows open for a period of time to cool down the interior of the car. This may cause an inconvenience if the vehicle contains material which may be blown away by the air moving through the open windows. In addition, the operator and his guests', if any, hair and clothing may become mussed while driving with the windows open.

SUMMARY OF THE INVENTION

It is therefore a primary object of the present invention to provide a convertible canopy apparatus to be mounted on the roof of an automobile for protecting the interior of the car from radical temperature variations when the automobile is left standing in the sun.

This and aother objects can be acheived by providing a convertible canopy apparatus for mounting on a roof of an automobile for protecting the interior of the automobile from radical temperature changes which includes a front and rear canopy devices normally sheltered under an airfoil cover. In use, the cover is raised up to a release position and the canopy devices are sequentially operated to extend the canopy in opposed longitudinal directions and in a telescopic fashion.

DESCRIPTION OF THE PREFERRED EMBODIMENTS

Figure 1:
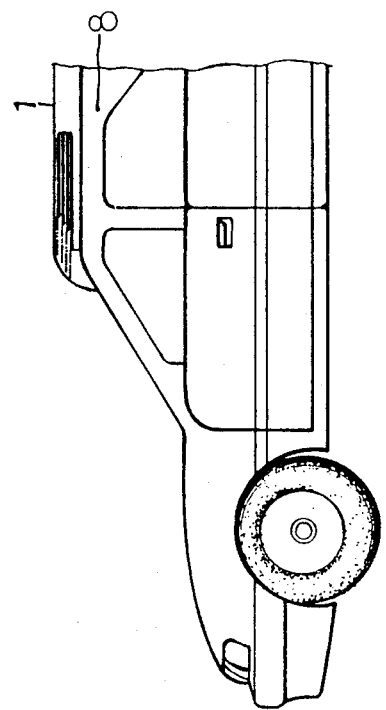
FIG. 1 is a partially side elevational view showing the canopy apparatus of the present invention.

Referring now to FIG. 1, there is illustrated an inventive convertible canopy apparatus 1 mounted on a roof 8 of a vehicle. In the instant Application, an automobile is illsutrated, however, other types of vehicles having a flat roof would also be able to use the invention.

Figure 3:
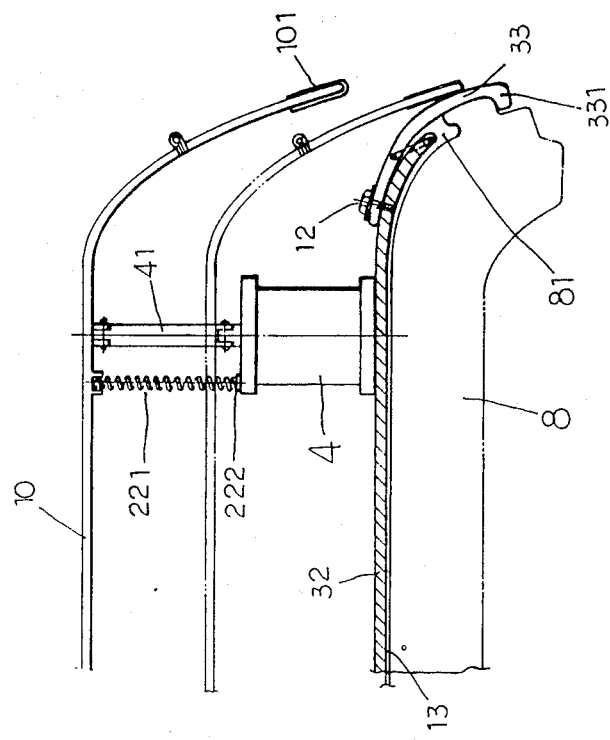
FIG. 3 is a partial cross-sectional view of the canopy device of the present invention.
Figure 2:
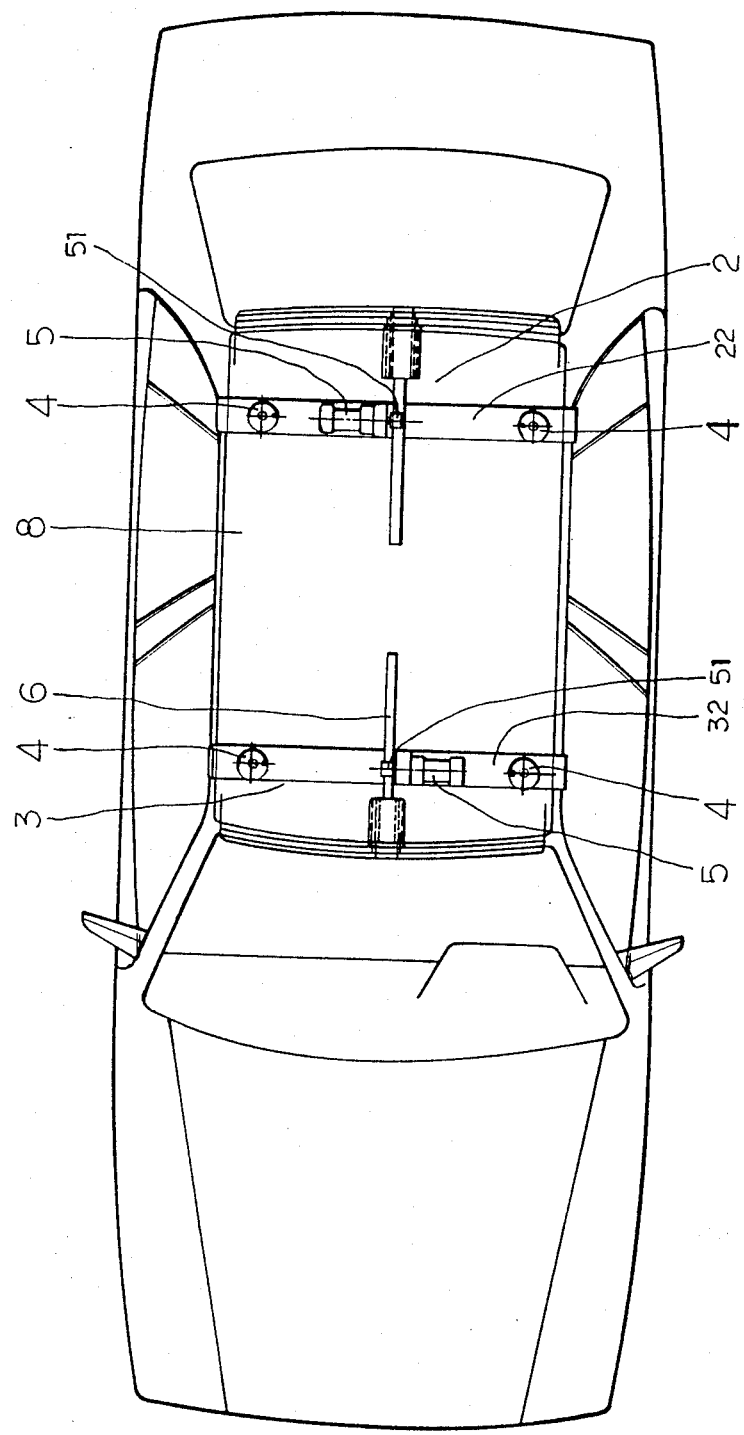
FIG. 2 is a top elevational view of the canopy apparatus which is mounted on a roof of a car wherein the cover thereof is removed.

The canopy device will now be more fully described by reference to FIGS. 2, 3 and 4. There are two convertible canopy devices, a front canopy device 3 and a rear canopy device 2, whcih are identical, operated to extend in telescopic fashion and in opposite directions. The convertible canopy devices are sheltered under a cover 10 when collapsed and face each other when mounted to the roof 8.

Each canopy device, such as the front canopy device 3, includes a support bar 32 positioned transversely on the vehicle's roof 8, and two legs 33, (one representative leg being shown in FIG. 3) each having one end connected with a respective end of the support bar 32 by means of threaded fastener 12 and the other end bent back down under itself to form a clip portion 331 which is secured under a gutter 81 of the car. Thus, the support bar 32 is secured to the roof of the car but can be removed when no longer needed. A layer of rubber sheet 13 is inserted between the roof 8 and the support bar 32 for protecting the roof 8 from being scraped. A protecting member 101 is further provided throughout the margin of the cover 10.

Two pneumatic cylinders 4 are uprightly mounted on two end portions of each support bar 22 and 32 with one end of its actuating rod 41 of each cylinder 4 being connected to a bracket which is attached to the bottom of the cover 10. The cover 10 is of a size substantially the same as the roof and in a shape of an airfoil. The cover 10 can be pushed upwardly to a release position that allows extension operations of the canopy devices 2, 3 or drawn back to a shelter position, when the canopies are collapsed, by simultaneously actuating the four cylinders 4.

Figures 4, 5:
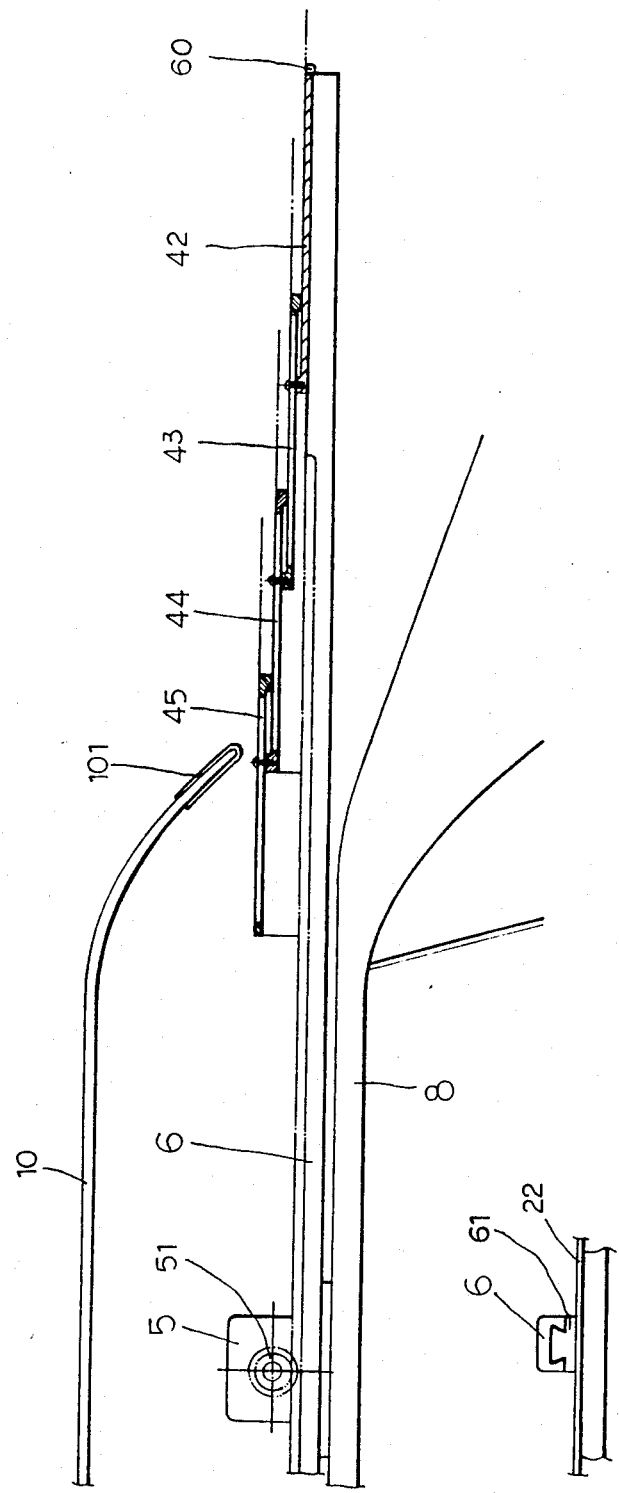
FIG. 4 is a partial cross-sectional view of the rear canopy device of the canopy apparatus with its canopy in fully extended condition.
FIG. 5 is an end view of a rack unit which is used in the canopy apparatus.
Figure 6:
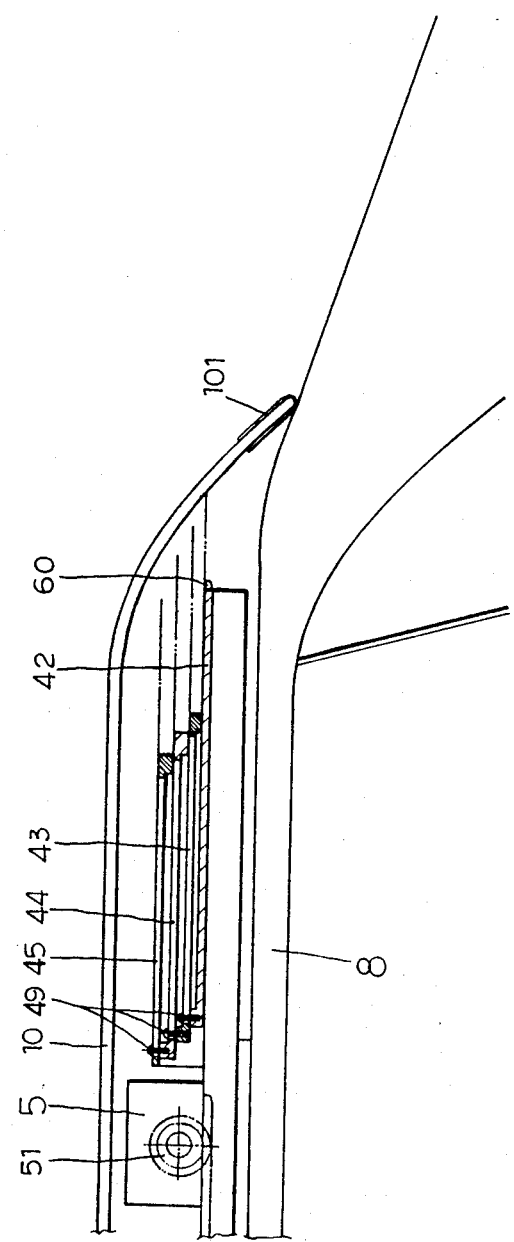
FIG. 6 is a partial cross-sectional view of the rear canopy drive of the canopy apparatus with its canopy in collapsed condition; and, FIG. 7 is a partial cross-sectional view of the canopy apparatus with its canopy shown partially extended to show the coupling between the shade members.
Figure 7:
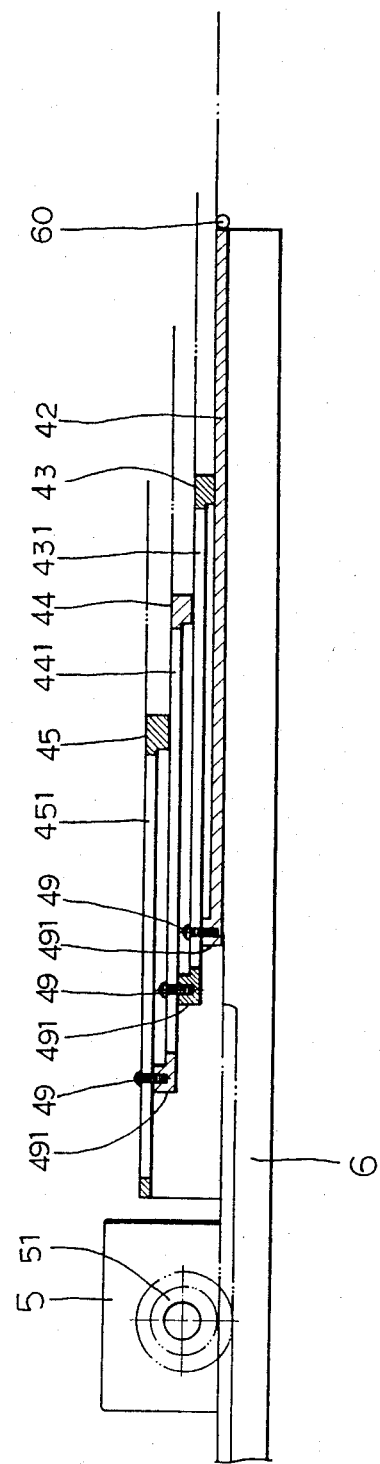

As shown in FIGS. 4, 6 and 7, the rear canopy device 2 further includes a rack 6 positioned perpendicular to the support bar 22 and slidably mounted on a rail 61, as shown in FIG. 5, and an intermeshable pinion gear 51 firmly mounted on a shaft of a reversible electric motor 5 mounted on the mid portion of the support bar 22. A series of channel-shaped shade members 42, 43, 44 and 45 are interengaged telescopically and positioned on a rear margin of the roof 8. The right hand member is slidably received in the left hand member by means of a rivet 49 connecting an upright tongue 491 of the right hand member to the left hand member and movable along a respective longitudinal slot 451, 441, 431 formed in the respective left hand member. The rack 6 extends through channels formed in the shade member in a longitudinal direction with the leading end 60 of rack 6 engaged with the utmost right hand shade member 42. The members are thus positively interengaged, the canopy of the rear device 2 can be fully extended over the rear windscreen and trunk portion of the car by actuating the rack 6 to slide rearwardly for a predetermined distance. The canopy of the front device 3 is identically operated to extend over the front windscreen and engine hood.

In the operation of the shading system, the front and rear canopy devices 3 and 2, respectively, are normally sheltered by the cover 10. The cover 10 is first lifted to its release position where a limit switch 222 mounted on a top portion of the case of one of the cylinders, as shown in FIG. 3, is connected by a spring 221 so that the canopies of the front and the rear devices 3 and 2 are interlocked with the cover 10 for extension in order to shade the car and thereby protect it from radical temperature changes as the car is parked in the sun.

The foregoing detailed description has been provided for clarity of understanding of the inventive concept only and no unnecessary limitations are to be construed therefrom. Modifications of the present invention may be made by those skilled in the art without departing from the spirit of the invention.

I calim:

1. A canopy apparatus for releasable coupling to a roof portion of an automobile, comprising:

support means disposed on said roof portion of said automobile for releasably coupling said canopy apparatus threto, said support means including a pair of support members being transversely disposed in space relationship on said roof portion;

first shade means coupled to one of said pair of support members for displacement from a retracted position to an extended position in a first direction;

second shade means coupled to the other of said pair of support members for displacement from a retracted position to an extended direction in a second direction, said second direction being opposite said first direction; and, hood means displaceably coupled to each of said pair of support members for concealing in said retracted position said first shade means and second shade means, said hood means including means for elevating said hood means from a first portion to a second position coupled to both said pair of support members to expose said first and second shade means, wherein said first and second shade means each includes (1) a plurality of shade members slidingly coupled each to the other in overlying relationship, said coupling between any two of said plurality of shade members being defined by a rivet fixedly coupled to a lower one of said two shade members and slidingly coupled to said overlying other of said two shade members through a longitudinally extended slotted through opening, (2) a rail member slidingly coupled to a respective one of said support members, said rail member having a distal end fixedly coupled to an endmost one of said plurality of shade members, and (3) reversible displacement means coupled to a respective one of said support members and drivingly coupled to said rail member for longitudinally displacing said rail member in (1) a first direction to telescopically extend said plurality of shade members, and (2) an opposite second direction to retract said plurality of shade members.

2. The canopy apparatus as recited in claim 1 where said support means includes a plurality of clip members for releasably coupling said pair of support members to said roof portion of said automobile.

3. The canopy apparatus as recited in claim 1 where said elevating means includes a pair of pneumatic cylinders coupled to each of said pair of support members, each of said pneumatic cylinders having a housing coupled to a respective support member and an actuating rod coupled to said hood means.

4. The canopy apparatus as recited in claim 1 where said reversible displacement means includes (1) an electric motor coupled to a respective one of said support members, and (2) a pinion gear coupled to said motor for engagement with said rail member, whereby said rail member is displaced responsive to rotation of said pinion gear.

* * * * *